US011210564B2

(12) United States Patent
Tatsumi

(10) Patent No.: US 11,210,564 B2
(45) Date of Patent: Dec. 28, 2021

(54) INFORMATION PROCESSING APPARATUS FOR CHARACTER RECOGNITION AND NON-TRANSITORY COMPUTER READABLE MEDIUM

(71) Applicant: FUJIFILM Business Innovation Corp., Tokyo (JP)

(72) Inventor: Daisuke Tatsumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 161 days.

(21) Appl. No.: 16/371,140

(22) Filed: Apr. 1, 2019

(65) Prior Publication Data
US 2019/0325272 A1  Oct. 24, 2019

(30) Foreign Application Priority Data
Apr. 19, 2018 (JP) .............................. JP2018-080421

(51) Int. Cl.
*G06K 9/00* (2006.01)
*G06K 9/62* (2006.01)

(52) U.S. Cl.
CPC ....... *G06K 9/6261* (2013.01); *G06K 2209/01* (2013.01)

(58) Field of Classification Search
CPC ........ G06K 9/38; G06K 9/18; G06K 9/00215; G06K 9/228; G06K 9/03; G06K 9/202; G06K 9/72; G06K 9/2011; G06K 9/222; G06K 19/06037; G06K 9/6261; G06T 7/0081; G06T 7/0083; G06T 2207/20144; G06T 2207/10016
See application file for complete search history.

(56) References Cited

U.S. PATENT DOCUMENTS

| | | | | | |
|---|---|---|---|---|---|
| 5,581,633 | A | * | 12/1996 | Hotta | G06K 9/348 382/171 |
| 5,821,929 | A | * | 10/1998 | Shimizu | G06F 16/40 382/190 |
| 5,949,906 | A | * | 9/1999 | Hontani | G06K 9/00442 382/177 |
| 6,014,460 | A | * | 1/2000 | Fukushima | G06K 9/72 382/177 |
| 6,665,436 | B2 | * | 12/2003 | Su | G06K 9/68 382/177 |
| 6,684,370 | B1 | * | 1/2004 | Sikorsky | G06F 40/103 715/205 |
| 6,950,555 | B2 | * | 9/2005 | Filatov | G06K 9/00852 358/462 |

(Continued)

FOREIGN PATENT DOCUMENTS

| | | |
|---|---|---|
| JP | 5216828 | 6/2013 |
| JP | 5538812 | 7/2014 |
| JP | 6055297 | 12/2016 |

*Primary Examiner* — Amir Alavi
(74) *Attorney, Agent, or Firm* — JCIPRNET

(57) ABSTRACT

An information processing apparatus includes a character recognition unit that performs a character recognition process to recognize a character included in an image, and a partitioning unit that partitions a specific region if a character string recognized through the character recognition process performed by the character recognition unit on a specific region included in the image includes a character or a character string, each of which satisfies a predetermined condition.

16 Claims, 9 Drawing Sheets

(56) References Cited

U.S. PATENT DOCUMENTS

| | | | |
|---|---|---|---|
| 7,623,715 B2 * | 11/2009 | Filatov | G06K 9/6292 |
| | | | 382/188 |
| 8,600,175 B2 | 12/2013 | Ishiguro | |
| 8,891,871 B2 * | 11/2014 | Eguchi | G06K 9/2054 |
| | | | 382/177 |
| 10,007,863 B1 * | 6/2018 | Pereira | G06K 9/6267 |
| 10,373,028 B2 * | 8/2019 | Ono | G06K 9/6212 |
| 2015/0278626 A1 * | 10/2015 | Nakamura | G06K 9/4609 |
| | | | 382/177 |

* cited by examiner

FIG. 3A

| CHARACTER | WIDTH | HEIGHT |
|---|---|---|
| K | 32 | 44 |
| L | 32 | 48 |
| M | 44 | 52 |
| N | 36 | 48 |
| O | 36 | 49 |
| P | 32 | 49 |
| Q | 40 | 57 |
| R | 32 | 49 |

FIG. 3B

| CHARACTER | WIDTH | HEIGHT |
|---|---|---|
| ∴ | 461 | 1381 |
| ; | 76 | 908 |
| ◎ | 264 | 929 |
| 1 | 208 | 1041 |
| ≡ | 45 | 1037 |
| I | 200 | 1041 |
| U | 36 | 48 |
| V | 40 | 49 | ially are designated with the same reference numeral and the discussion thereof is not duplicated.

INFORMATION PROCESSING APPARATUS FOR CHARACTER RECOGNITION AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-080421 filed Apr. 19, 2018.

BACKGROUND

Technical Field

The present invention relates to an information processing apparatus and a non-transitory computer readable medium.

SUMMARY

According to an aspect of the invention, there is provided an information processing apparatus. The information processing apparatus includes a character recognition unit that performs a character recognition process to recognize a character included in an image, and a partitioning unit that partitions a specific region if a character string recognized through the character recognition process performed by the character recognition unit on a specific region included in the image includes a character or a character string, each of which satisfies a predetermined condition.

BRIEF DESCRIPTION OF THE DRAWINGS

Exemplary embodiments of the present invention will be described in detail based on the following figures, wherein:

FIG. 3A and FIG. 3B illustrate examples of a list of sizes of recognized characters;

DETAILED DESCRIPTION

Figure 1:
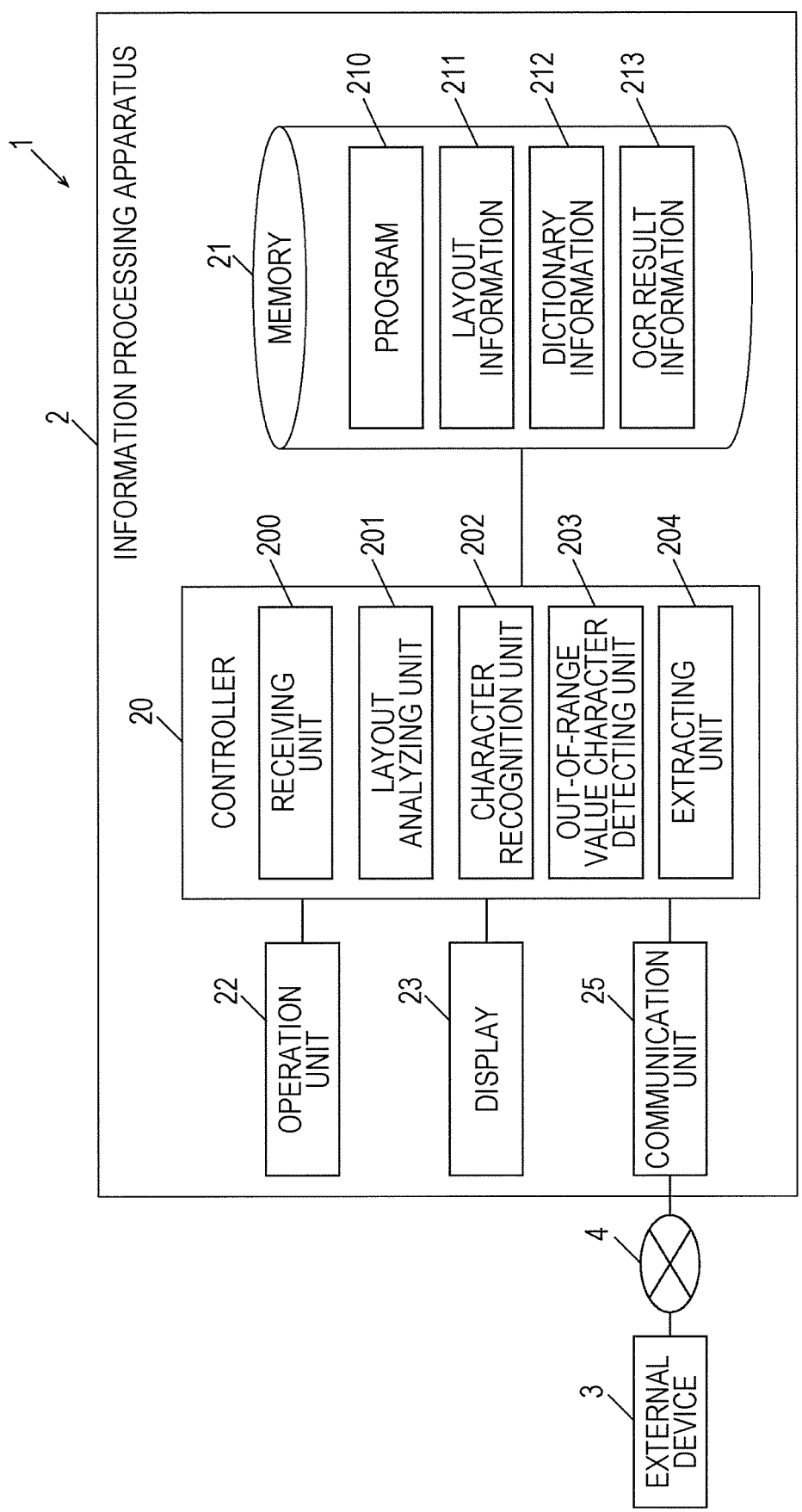
FIG. 1 is a block diagram illustrating an example of a control system in an information processing system of a first exemplary embodiment of the present invention.

Exemplary embodiments of the present invention are described below with reference to the drawings. As illustrated in the drawings, elements having an identical functionality are designated with the same reference numeral and the discussion thereof is not duplicated.

An information processing apparatus in accordance with the exemplary embodiments includes a character recognition unit that performs a character recognition process to recognize a character included in an image, and a partitioning unit that partitions a specific region if a character string recognized through the character recognition process performed by the character recognition unit on the specific region included in the image includes a character or a character string, each of which satisfies a predetermined condition.

The "image" is digital data of a document, a photograph, a drawing, or the like. The "specific region" refers to a region corresponding to a partial image contained in the image. It will be understood that the "specific region" includes a region corresponding to the single whole image. The "character recognition process" may include an optical character recognition (OCR) process or the like.

First Exemplary Embodiment

FIG. 1 is a block diagram illustrating an example of a control system in an information processing system 1 of the first exemplary embodiment of the present invention. The information processing system 1 includes an information processing apparatus 2, and an external device 3 that is connected to the information processing apparatus 2 via a network 4. The information processing apparatus 2 may be a personal computer (PC), an image forming apparatus, a tablet terminal, a multi-function portable telephone (smart phone), or the like.

The external device 3 may include a personal computer (PC), a server apparatus, or the like. The network 4 may be a local area network (LAN), the Internet, or the like, and may be a wireless or wired system.

The information processing apparatus 2 includes a controller 20 that controls each element of the information processing apparatus 2, a memory 21 that stores a variety of data, an operation unit 22 that includes a keyboard, a mouse, and the like, a display 23 that includes a liquid-crystal display or the like, and a communication unit 25 that transmits or receives a signal to or from the external device 3 via the network 4. The operation unit 22 and the display 23 may be integrated into an operation and display unit in a unitary body (not illustrated).

The controller 20 includes a central processing unit (CPU), an interface, and the like. The CPU operates in accordance with a program 210 stored on the memory 21, and thus implements the functionalities of a receiving unit 200, a layout analyzing unit 201, a character recognition unit 202, an out-of-range value character detecting unit 203, an extracting unit 204, or the like. The layout analyzing unit 201 is an example of a partitioning unit. The out-of-range value character detecting unit 203 is an example of a detecting unit. The receiving unit 200 through the extracting unit 204 will be described in detail below.

The memory 21 includes a read only memory (ROM), a random-access memory (RAM), and a hard disk, and stores a variety of data including the program 210, layout information 211, dictionary information 212, OCR result information 213. The layout information 211 is acquired through layout analysis described below. The dictionary information 212 is dictionary data into which a pattern of a character used in optical character recognition (OCR) is organized. The OCR result information 213 is related to the results of the OCR process.

Figure 2A:
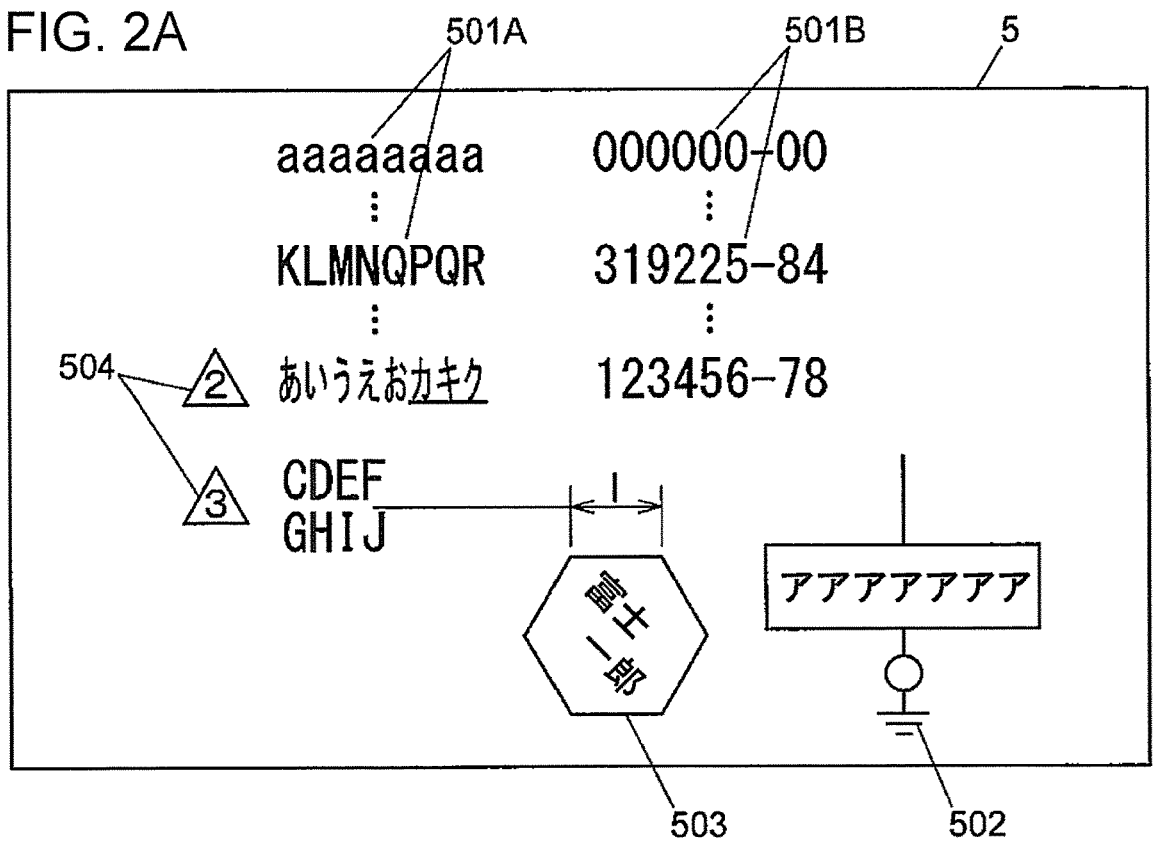
FIG. 2A illustrates an example of an image prior to layout analysis.

Referring to FIG. 2A through FIG. 4, each of the receiving unit 200 through the extracting unit 204 in the controller 20 is described below. FIG. 2A illustrates an example of an image prior to layout analysis, and FIG. 2B illustrates an example of a layout-analyzed image.

The receiving unit 200 receives an image 5 input to the information processing apparatus 2. The image 5 may also be the one transmitted from the external device 3.

Referring to FIG. 2A, the image 5 includes character information, such as a character string 501A (in the specification, numerals are included in characters, but a numeral string is designated with a reference number "501B" different from the reference number of the character string as illustrated in FIG. 2A, and the same is true of the other cases), and graphic information, such as a wiring diagram 502, a drawing 503, a correction symbol 504, and the like. The character string 501A may include characters of the English alphabets, and other language letters, such as Japanese Hiragana letters, Japanese Katakana letters, and Kanji letters.

The character string 501A may be associated with a symbol, such as an underline. The graphic information is illustrated for an exemplary purpose only. The graphic information may further include a schematic diagram, an emoji, a symbol mark, and a variety of symbols (a decoration symbol, a drafting symbol, a schematic symbol, a map symbol, and a weather chart symbol).

Figure 2B:
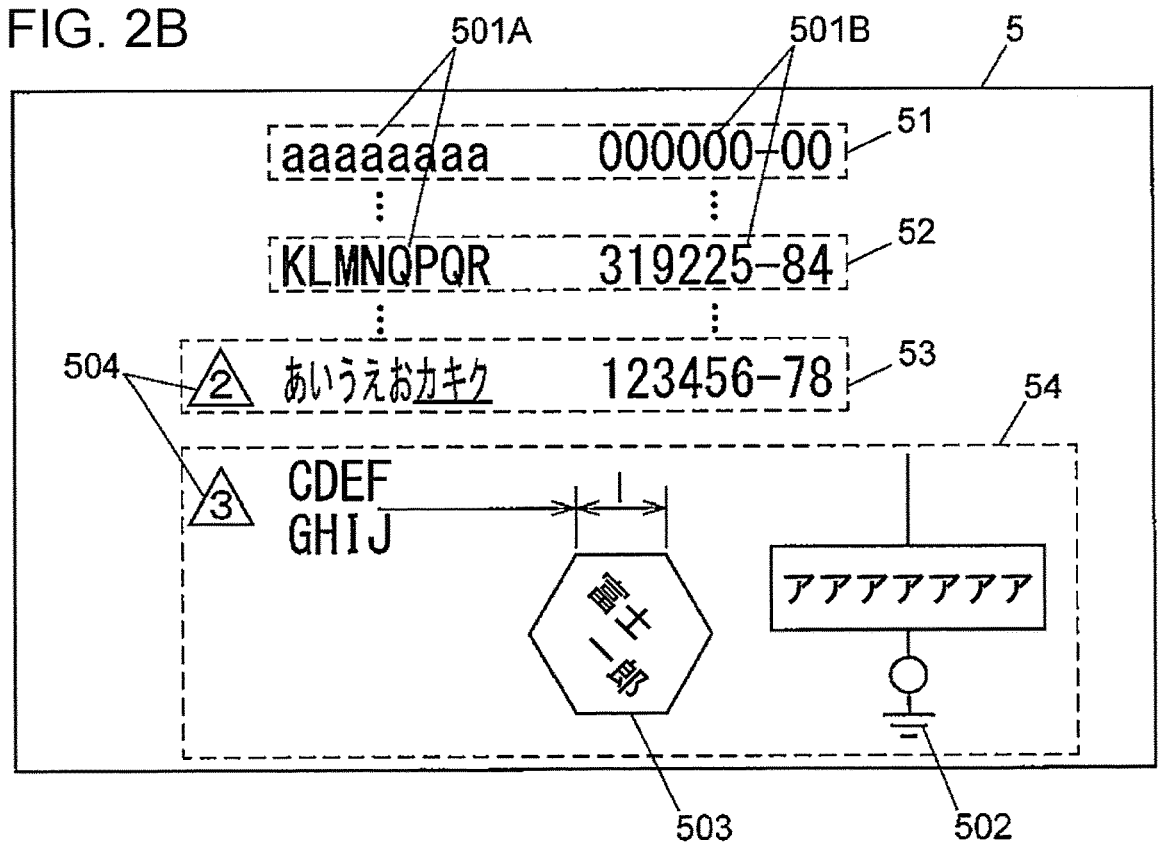
FIG. 2B illustrates an image subsequent to the layout analysis.

Referring to FIG. 2B, the layout analyzing unit 201 performs layout analysis on the image 5 received by the receiving unit 200, thereby partitioning the image 5 into partial regions 51, 52, 53, and 54. Related art algorithm may be used for layout analysis. The partial regions 51, 52, 53, and 54 are examples of a specific region.

The layout analysis may be the XY-cut method. In the XY-cut method, a frequency distribution of black pixels (referred to as a "histogram") is obtained by projecting an image horizontally and vertically, and a minimum value (also referred to as a "trough of a marginal distribution") and a maximum value (also referred to as a "peak of the marginal distribution") of the histogram in each direction are identified. If the identified minimum value or maximum value satisfies a specific condition, the image is recursively partitioned along a pixel serving as a border giving the minimum or maximum value.

The layout analyzing unit 201 stores on the memory 21 the layout information 211 related to the partial regions 51, 52, 53, and 54 obtained by partitioning the image 5 through the layout analysis. The layout information 211 includes information indicating sizes and attributes (a character string, a table, a graphic, or the like) of the partial regions 51, 52, 53, and 54, and region position information indicating the positions of the partial regions 51, 52, 53, and 54 in the image 5.

The character recognition unit 202 performs a character recognition process to recognize a character included in each of the partial regions 51, 52, 53, and 54 which the layout analyzing unit 201 has partitioned the image 5 into. The character recognition process includes an optical character recognition (OCR) process in which a pattern of a character is extracted from a partial region on a per character basis, the pattern of the character is compared with a pattern of a character recorded in the dictionary information 212 on the memory 21, using a pattern matching technique, and a character having the highest similarity is output as a result.

The character recognition unit 202 associates results obtained through the OCR process (OCR results) with the partial regions 51, 52, 53, and 54, and then stores the OCR results in a text format as the OCR result information 213 on the memory 21. The OCR result information 213 includes character information indicating a character and a character string recognized through the character recognition process, character position information indicating the position of the recognized character or character string in the image, and character size information indicating a size, such as a width and/or a height, of the recognized character.

If the OCR result information 213 on a specific partial region is newly acquired with the OCR result information 213 stored on the memory 21, the character recognition unit 202 substitutes the newly acquired OCR result information 213 for the stored OCR result information 213.

The out-of-range value character detecting unit 203 detects a character having an attribute out of range of the average attribute of all characters contained in the image 5 (hereinafter referred to as an "out-of-range value character") from the OCR result information 213 acquired by the character recognition unit 202. The out-of-range value character is an example of a character that satisfies a predetermined condition.

The out-of-range value character detecting unit 203 detects as the out-of-range value character a character having a size out of a predetermined range (also referred to as a size having an "abnormal value"). Concerning the size of each character, only the width of the character may be used as an index, only the height of the character may be used as an index, or a value resulting from assessing a combination of the width and height of the character may be used as an index.

More specifically, the out-of-range value character detecting unit 203 may calculate the distribution of the sizes of the characters recognized through the character recognition process that the character recognition unit 202 has performed on the entire image 5, and detects an out-of-range value character that has an abnormal value in the size in accordance with the calculated distribution. More specifically, the out-of-range value character detecting unit 203 may calculate the distribution of the sizes of the characters using a statistic technique, such as Smirnov-Grubbs test.

Specific examples are described in connection with FIG. 3A and FIG. 3B. FIG. 3A and FIG. 3B illustrate examples of lists of character sizes. FIG. 3A illustrates an example of a list of sizes of English alphabet letters in a partial region 52 of FIG. 2B ("KLMNQPQR") and FIG. 3B illustrates a list of sizes of English alphabet letters in another partial region 54 of FIG. 2B ("CDEFGHIJ"). Unit of size is the number of pixels.

FIG. 3A illustrates an example of characters that have been correctly recognized by the character recognition unit 202, and FIG. 3B illustrates an example of characters that have erroneously recognized by the character recognition unit 202 ("∴;⊚1∋|UV"). The phrase "the characters that have been correctly recognized" means that actually written characters have been correctly recognized, and "the characters that have been erroneously recognized" mean that characters different from the actually written characters have been recognized. The characters may be erroneously recognized if the character recognition unit 202 erroneously recognizes multiple characters or part of a single character as a character because of an inappropriate partial region on which the character recognition process is performed.

If a character is correctly recognized by the character recognition unit 202 as illustrated in FIG. 3A, the recognized character has the width and height similar in value to those of other characters. If the character recognition unit 202 erroneously recognizes characters as illustrated in FIG. 3B, variations (variance values) in the width and height of the character increase.

The out-of-range value character detecting unit 203 calculates the mean value and the standard deviation of the sizes of the characters recognized through the character recognition process that the character recognition unit 202 performs on the entire image 5. The out-of-range value character detecting unit 203 then calculates a value (hereinafter referred to as an "assessment value") that is obtained by dividing a difference (absolute value) between the size of a target character and the mean value by the standard deviation. If the calculated assessment value exceeds a predetermined threshold value, the out-of-range value character detecting unit 203 determines the character having an abnormal size to be an out-of-range value character.

The mean value is an example of a first index value. The mean value indicates the mean value of the sizes of the characters contained in the entire image 5, and may also be referred to as an estimated value of the size of a character that is a detection target. The standard deviation is an example of a second index value. A range indicated by a product of the standard deviation and the threshold value corresponds to a predetermined range. The threshold value is an example of a value that is used to identify the range predetermined with the standard deviation.

If the mean value of the characters contained in the entire image 5 is 35.5 (pixels), the standard deviation is 4.5, and the threshold value is 2.0, the following table lists calculated assessment values in the example of the character recognition process performed on the partial region 54 of FIG. 3B.

TABLE

| Character | Width | | Height | |
| --- | --- | --- | --- | --- |
| | Difference from mean value | Assessment value | Difference from mean value | Assessment value |
| ∴ | 425.5 | 94.5 | 1331.5 | 335.9 |
| ; | 40.5 | 9.0 | 858.5 | 229.4 |
| ⊚ | 228.5 | 50.7 | 879.5 | 235.1 |
| 1 | 172.5 | 38.3 | 991.5 | 265.0 |
| ₹ | 9.5 | 2.1 | 987.5 | 263.9 |
| | | 164.5 | 36.5 | 991.5 | 265.0 |
| U | 0.5 | 0.1 | 1.5 | 0.4 |
| V | 4.5 | 1.0 | 0.5 | 0.1 |

In such a case, the out-of-range value character detecting unit 203 detects, as out-of-range value characters, characters "∴", ";","⊚", "1", "₹", "|", "U", and "V" having the assessment values exceeding the threshold value of 2.

In the example described above, a character having an abnormal value in size is determined to be an out-of-range value character. The out-of-range value character is not limited to this type of character. The out-of-range value character may include a character having a different font. The mean value and standard deviation of the sizes of the characters in the entire image 5 are calculated. The calculation is not limited to that method. For example, the mean value and standard deviation of the sizes of the characters in each partial region may be calculated.

Figure 4:
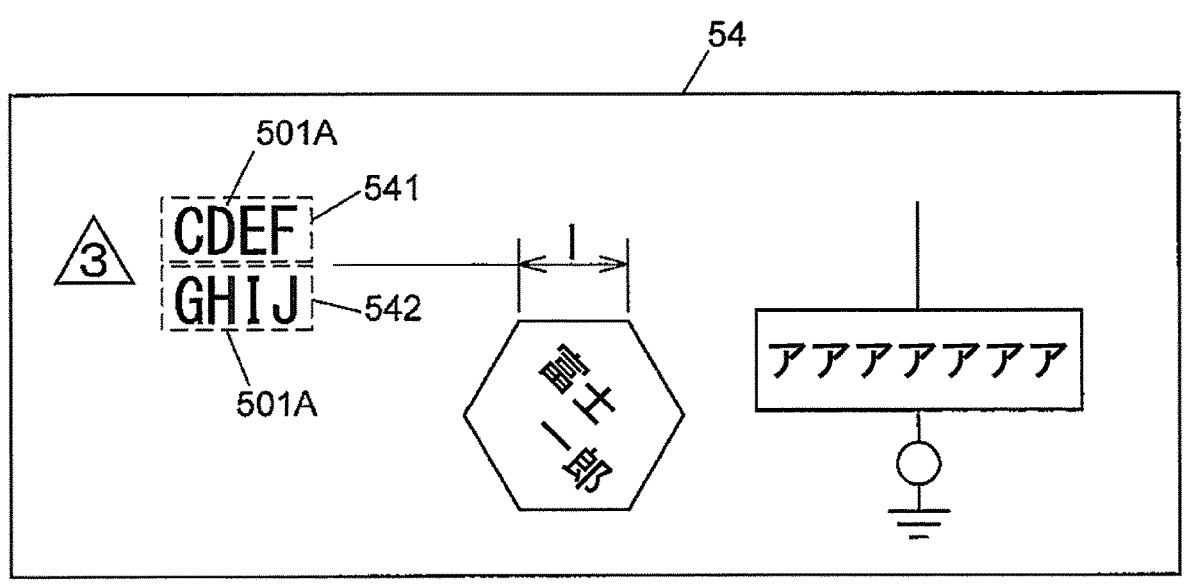
FIG. 4 illustrates an example of an extracted partial region.

FIG. 4 illustrates an example of the extracted partial region 54. Based on detection results of the out-of-range value character detecting unit 203, the extracting unit 204 identifies the partial region containing the out-of-range value characters (∴;⊚1₹|UV respectively correspond to "CDEFGHIJ") from multiple partial regions 51, 52, 53, and 54, and extracts the identified partial region 54. The number of partial regions extracted by the extracting unit 204 may be 1 or more.

The extracting unit 204 may identify a partial region containing an out-of-range value character as a region to be extracted, or may identify a partial region containing a predetermined number of out-of-range value characters as a region to be extracted. When a partial region containing multiple out-of-range value characters is to be extracted, the extracting unit 204 may identify as a region to be extracted a region where a ratio of the number of out-of-range value characters to the number of characters contained in the region (referred to as a "character string length of the partial region") is equal to or above a predetermined value.

Referring to FIG. 4, the layout analyzing unit 201 performs layout analysis on the partial region 54 extracted by the extracting unit 204, and further partitions the extracted partial region 54 into partial regions 541 and 542 (also referred to as "partitioned regions 541 and 542" to be differentiated from the "partial region of the image 5"). The regions 541 and 542 are examples of a partitioned region. The layout analysis performed herein may be identical to or may be different from the previously described layout analysis.

The character recognition unit 202 performs the character recognition process (again) on the partitioned regions 541 and 542. The character recognition unit 202 may perform the character recognition process again only if the partial region 54 is partitioned into the multiple regions 541 and 542. The character recognition unit 202 may not necessarily perform the character recognition process again if the partial region 54 is not partitioned into the multiple regions 541 and 542. Alternatively, an operator may check a partitioned region having an abnormal value. If the operator determines that the character recognition process is not to be performed, the character recognition process may not be performed again.

Figure 5:
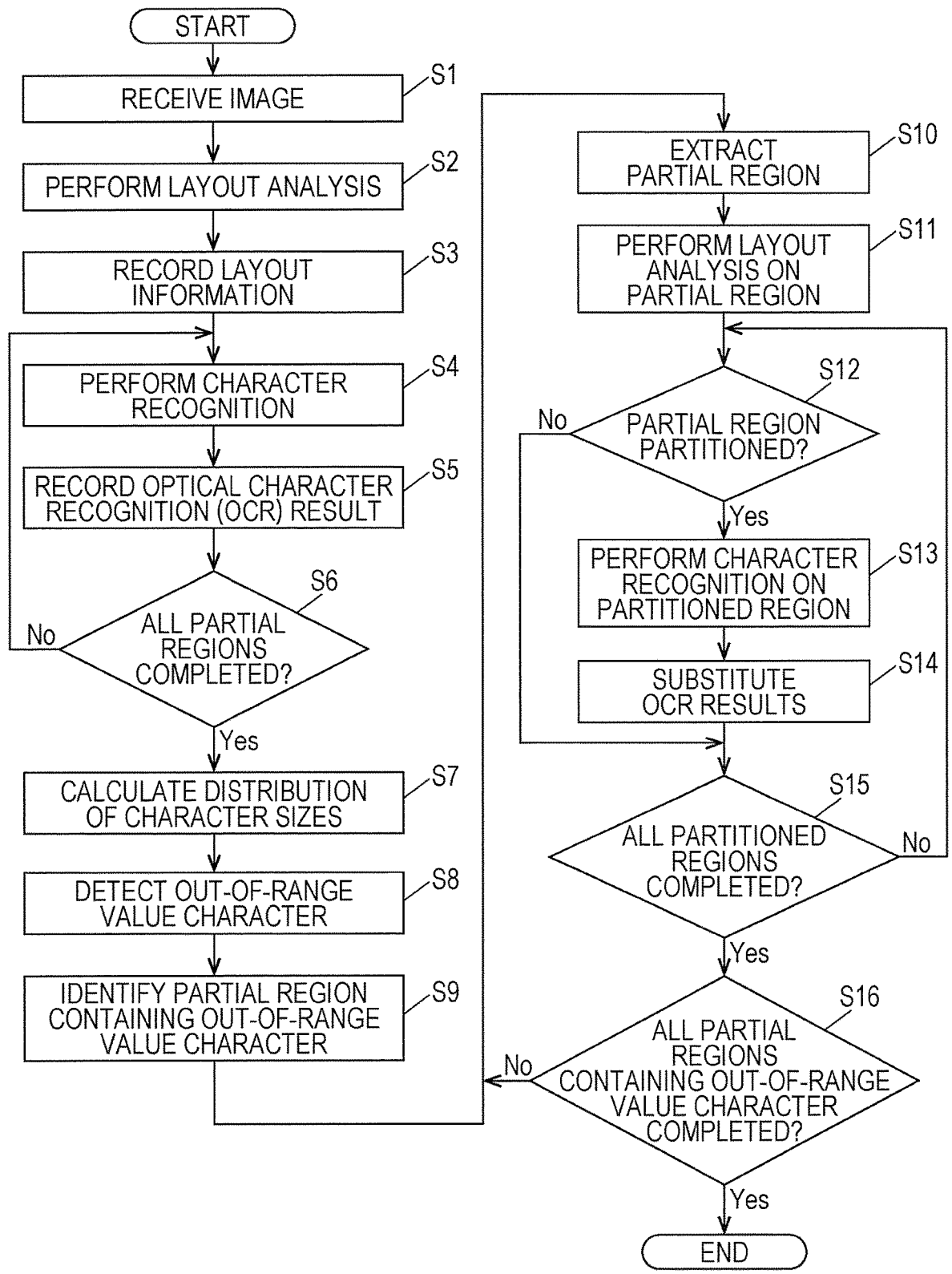
FIG. 5 is a flowchart illustrating a process of an information processing apparatus of the first exemplary embodiment.

An example of the process of the information processing apparatus 2 is described in connection with FIG. 2A through FIG. 5. FIG. 5 is a flowchart illustrating the process of the information processing apparatus 2. The receiving unit 200 receives the image 5 (see FIG. 2A) input to the information processing apparatus 2 (S1), and transfers the image 5 to the layout analyzing unit 201.

The layout analyzing unit 201 performs layout analysis on the image 5 received by the receiving unit 200 (S2), and partitions the image 5 into partial regions 51, 52, 53, and (see FIG. 2B). The layout analyzing unit 201 records the layout information 211 (S3).

The character recognition unit 202 performs the character recognition process on each of the partial regions 51, 52, 53, and 54 (S4). The character recognition unit 202 stores the OCR result information 213, obtained through the character recognition process, in association with the partial regions 51, 52, 53, and 54 (S5).

The character recognition unit 202 performs the operations in steps S4 and S5 on all of the partial regions 51, 52, 53, and 54 partitioned by the layout analyzing unit 201. If the character recognition unit 202 has performed the operations in steps S4 and S5 on all of the partial regions 51, 52, 53, and 54 partitioned by the layout analyzing unit 201 (yes branch from S6), the out-of-range value character detecting unit 203 calculates the distribution of the sizes of the characters recorded as the OCR result information 213 on the memory 21 (S7) (see FIG. 3A and FIG. 3B). The out-of-range value character detecting unit 203 detects an out-of-range value character in accordance with the calculated distribution of the sizes of the characters (S8).

The extracting unit 204 references the layout information 211 and the OCR result information 213 on the memory 21 and identifies a partial region containing the out-of-range value character detected by the out-of-range value character detecting unit 203 (such as the partial region 54 of FIG. 2B) (S9). The extracting unit 204 extracts the identified partial region 54 (S10) (see FIG. 4).

The layout analyzing unit 201 performs layout analysis on the partial region 54 extracted by the extracting unit 204 (S11), and partitions the extracted partial region 54 into the regions 541 and 542 (see FIG. 4).

If the extracted partial region is partitioned into the regions 541 and 542 (yes branch from S12), the character recognition unit 202 performs the character recognition process on each of the partitioned regions 541 and 542 (S13). The character recognition unit 202 records the OCR result information 213 in association with the partitioned regions 541 and 542. More specifically, the character recognition unit 202 substitutes the newly acquired OCR result information 213 for the corresponding OCR result information 213 stored on the memory 21 (S14).

The character recognition unit 202 performs the operations in steps S13 and S14 on all the regions 541 and 542 partitioned by the layout analyzing unit 201 (S15). The operations in steps S10 through S15 are performed on all partial regions 54 extracted by the extracting unit 204 and having out-of-range value characters (S16).

Second Exemplary Embodiment

Figure 6:
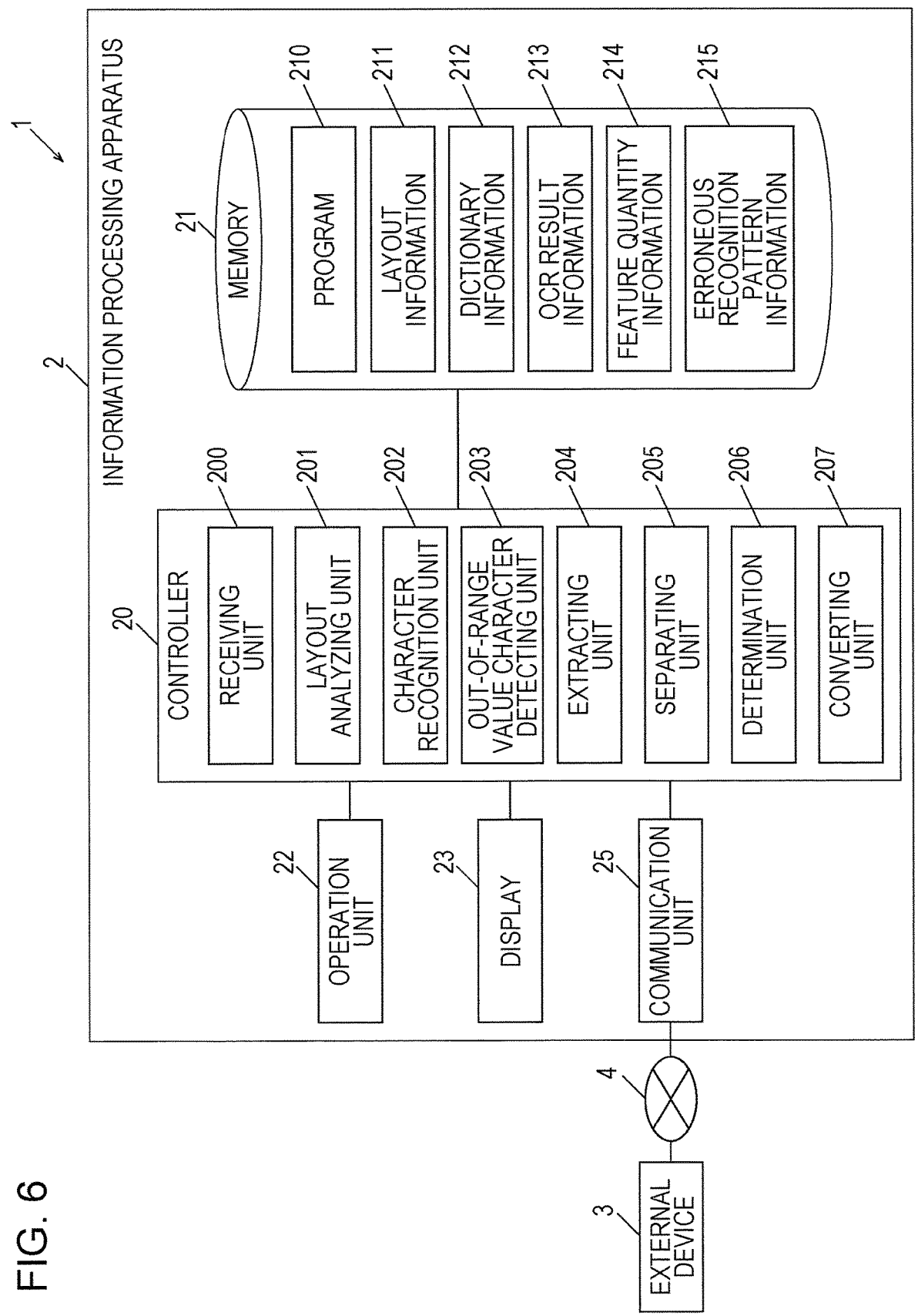
FIG. 6 is a block diagram illustrating an example of a control system in an information processing system of a second exemplary embodiment.

FIG. 6 is a block diagram illustrating an example of a control system of the information processing system 1 of a second exemplary embodiment. The second exemplary embodiment is different from the first exemplary embodiment in that the controller 20 of the second exemplary embodiment further includes a separating unit 205, a determination unit 206, and a converting unit 207. Elements of the second exemplary embodiment identical in configuration and functionality to those of the first exemplary embodiment are designated with the same reference numerals and the discussion thereof is omitted herein. The following discussion focuses on a difference between the first exemplary embodiment and the second exemplary embodiment.

A central processing unit (CPU) of the controller 20 operates in accordance with the program 210 stored on the memory 21, thereby implementing the functionalities of the separating unit 205, the determination unit 206, and the converting unit 207 in addition to the functionalities of the first exemplary embodiment. The separating unit 205 through the converting unit 207 will be described in detail below.

The memory 21 further stores a variety of data including feature quantity information 214 and erroneous recognition pattern information 215 in addition to the information described with reference to the first exemplary embodiment.

The feature quantity information 214 indicates a feature quantity of a character calculated through an arrangement of characters collected from past events in advance. For example, the feature quantity is collected through N-gram (N is a natural number) or morphological analysis. A character string contained in the feature quantity information 214 is an example of a predetermined character string. N is an example of a predetermined unit.

The erroneous recognition pattern information 215 is a list, for example, that lists a combination of characters that tend to be erroneously recognized through the character recognition process performed by the character recognition unit 202. The "characters that tend to be erroneously recognized" mean characters that tend to be recognized as characters different from actual characters through the character recognition process.

The combination of characters that tend to be erroneously recognized includes characters similar in shape. For example, the combination of characters that tend to be erroneously recognized may be the combination of Japanese Hiragana letter "し" and Japanese Katakana latter "レ". Other combinations of characters that tent to be erroneously recognized may include a combination of an alphabet and a numeral (such as "D" and "0"), and a combination of alphabets (such as "I" (uppercase letter) and "l" (lowercase letter)).

The separating unit 205 separates a character string acquired by the character recognition unit 202 through N-gram. N-gram refers to a method that extracts consecutive N letters as a partial character string from a character string. Morphological analysis may be used instead of N-gram.

An example of N-gram is explained with N being 2. For example, when the separating unit 205 acquires a character string "⊇4S∀◉", the character string is separated through 2-gram into four character strings of "⊇4", "4S", "S∀", and "∀◉" (hereinafter referred to as "separated character string"). The separated character string is an example of a partial character string. The symbol "⊇" represents a set symbol, and the symbol "∀" represents a universal quantifier, and the symbol "◉" represents a double circle mark.

The determination unit 206 compares a character string recognized by the character recognition unit 202 with the feature quantity information 214 stored on the memory 21, and determines whether the character string recognized by the character recognition unit 202 includes a character string that contains an uncommon arrangement of characters (hereinafter referred to as an "uncommon character string"). The uncommon arrangement of characters is an example of a predetermined arrangement of characters. The uncommon character string is an example of a character string that satisfies a predetermined condition.

More specifically, the determination unit 206 references the feature quantity information 214 and a character string separated from the character string by the separating unit 205, and determines whether the character string is an uncommon character string. The "uncommon arrangement of characters" refers to a line of characters that has no particular meaning unless that line of characters is specifically defined.

The determination unit 206 determines whether the partial regions are results into which the layout analyzing unit 201 has correctly partitioned the image 5 (hereinafter referred to as a "correct partition determination operation"). More specifically, the determination unit 206 determines that a partial region containing an uncommon character string is a partial region that is not correctly partitioned (in other words, a partial region that is erroneously partitioned). The determination unit 206 also determines that a partial region not containing an uncommon character string is a partial region that is correctly partitioned.

In accordance with the ratio of the separated character strings to the feature quantity information 214, the determination unit 206 determines whether the character string is an uncommon character string. More specifically, the determination unit 206 checks each character string separated from the character string by the separating unit 205 against information stored in the feature quantity information 214, and determines that the character string is an uncommon character string if the ratio of the separated character strings to the feature quantity information 214 is a predetermined value or above.

In the example described above, the feature quantity information 214 on the memory 21 includes three types of character strings of "⊐4", "S∀", and "∀⊚" as uncommon character strings (for example, a character string that is obtained when a partial region partitioned by the layout analyzing unit 201 is not correct). The determination unit 206 determines that three types out of the four types of the separated character strings are contained in the feature quantity information 214, and thus calculates the ratio to be 3/4 (=75%). The determination unit 206 thus determines in accordance with the ratio that a character string of "⊐4S∀⊚" is an uncommon character string.

The determination unit 206 performs the correct partition determination operation using another method, such as term frequency—inverse document frequency (TF-IDF). TF-IDF refers to calculating a ratio of the separated character strings to the feature quantity information 214 by accounting for a contribution ratio predetermined for each separated character string. The contribution ratio may be recorded in advance in association with each separated character string in the feature quantity information 214 on the memory 21.

The character string, such as "4S", which could appear regardless of whether the partial region is correctly partitioned, may be set to have a lower contribution ratio to the correct partition determination operation. In contrast, the character string, such as "∀⊚", which is less likely to appear if the partial region is not correctly partitioned, may be set to have a higher contribution ratio to the correct partition determination operation.

The converting unit 207 references the erroneous recognition pattern information 215 on the memory 21. If a character recorded in the erroneous recognition pattern information 215 on the memory 21 is contained in the character string recognized by the character recognition unit 202, the converting unit 207 converts the character forming the recognized character string into a corresponding character. A character serving as a conversion target prior to conversion is an example of a first character, and a converted character is an example of a second character.

In one example, if a character string recognized by the character recognition unit 202 is "OESCRIPTION", the converting unit 207 references the erroneous recognition pattern information 215 on the memory 21, and then converts "0" into "D". In this way, the character string "0ESCRIPTION" is converted into the character string "DESCRIPTION".

In yet another example, if a particular character and a space are lined, the converting unit 207 deletes the space. For example, if the letter "I" is recognized as the first person, a space is located prior to and subsequent to the letter "I". For example, a space is recognized prior to and subsequent to the letter "I", such as "PREV I OUS", one space is present between "V" and "I", and another space between "I" and "O". In such a case, the converting unit 207 deletes the spaces on both sides of the letter "I" as a particular letter, thereby converting "PREV I OUS" into "PREVIOUS".

Several methods of the correct partition determination responsive to the arrangement of a character string recognized by the character recognition unit 202 are described. The methods may be combined. A determiner is created in advance through machine learning (decision tree) in accordance with an amount of data of feature quantity to be used in the correct partition determination, and is then used for the correct partition determination.

Second Exemplary Embodiment

Figure 7:
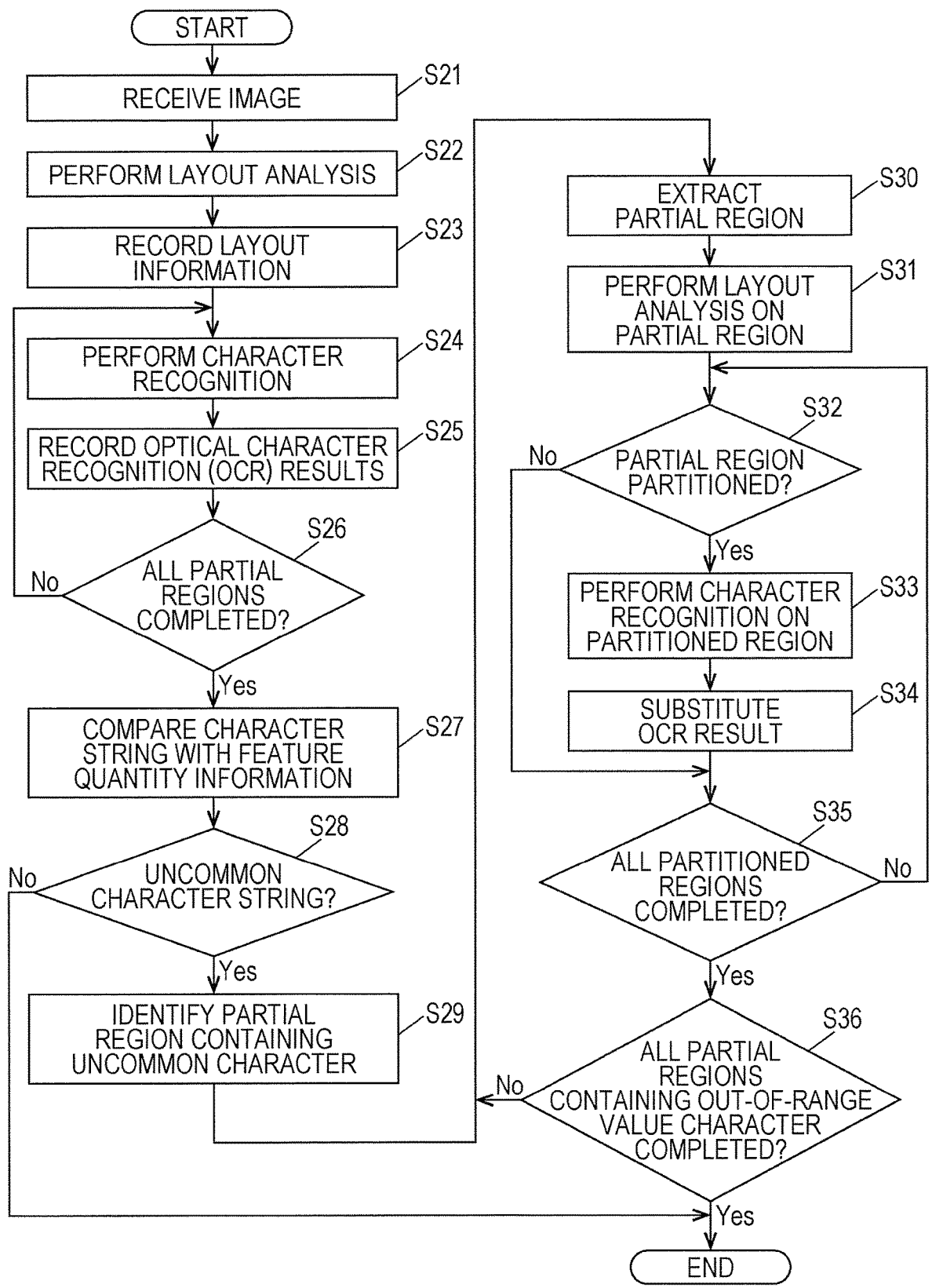
FIG. 7 is a flowchart illustrating a process of the information processing apparatus of the second exemplary embodiment.

A process of the information processing apparatus 2 is described in connection with FIG. 7. FIG. 7 is a flowchart illustrating the process of the information processing apparatus 2 of a second exemplary embodiment. In accordance with the second exemplary embodiment, operations in steps S21 through S26 are respectively identical to the operations in steps S1 through S6.

The receiving unit 200 receives the image 5 (S21). The layout analyzing unit 201 performs layout analysis on the image 5 (S22), and records the layout information 211 (S23). If the determination result in S26 is non-affirmative (no), the character recognition unit 202 performs the character recognition process on each of the partial regions 51, 52, 53, and 54 (S24), and records the OCR result information 213 in association with the partial regions 51, 52, 53, and 54 (S25).

If the character recognition process has been performed on all the partial regions 51, 52, 53, and 54 (yes branch from S26), the determination unit 206 compares the recognized character string with the feature quantity information 214 stored on the memory 21 (S27), and the character recognition unit 202 determines whether the character string recognized by the character recognition unit 202 is an uncommon character string (S28). As previously described, the target character string to be compared with the feature quantity information 214 on the memory 21 may be the separated character string obtained by the separating unit 205 in advance. Alternatively, the converting unit 207 may convert and separate a particular character.

If the character string recognized by the character recognition unit 202 is an uncommon character string (yes branch from S28), the extracting unit 204 identifies a partial region containing the uncommon character string (S29).

Operations in steps S30 through S36 are also respectively identical to the operations in steps S10 through S16 of the first exemplary embodiment. The extracting unit 204 extracts the identified partial region (S30). The layout analyzing unit 201 performs layout analysis on the extracted partial region (S31), and partitions the partial region into regions. If the determination result in step S35 is non-affirmative (no), the character recognition unit 202 performs the character recognition process (S33), and substitutes the OCR result information 213 (S34). Operations in steps S30 through S35 are executed on all partial portions extracted by the extracting unit 204 (see S36).

Third Exemplary Embodiment

Figure 8:
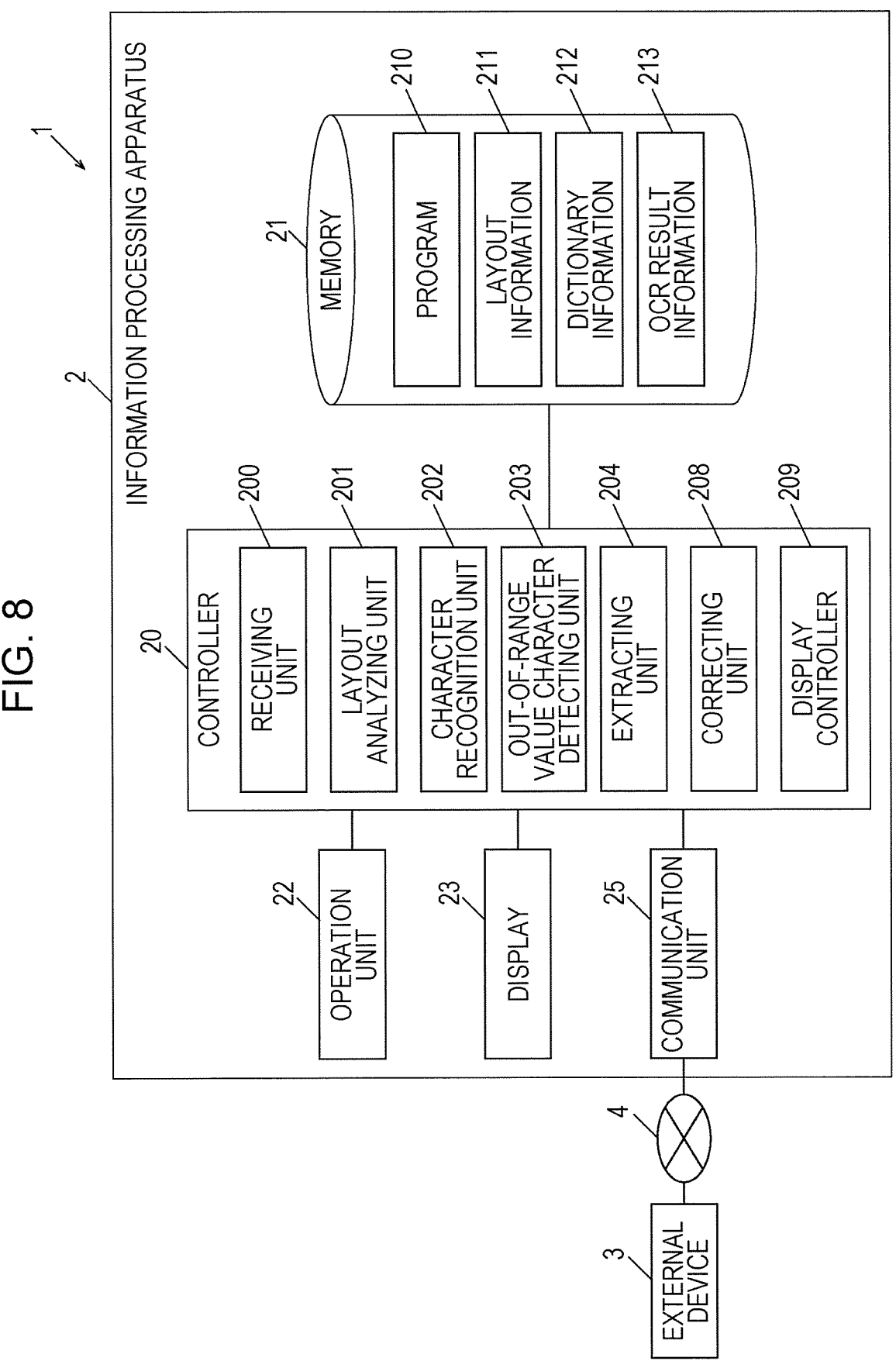
FIG. 8 is a block diagram illustrating a control system in an information processing system of a third exemplary embodiment of the present invention.

FIG. 8 is a block diagram illustrating an example of a control system in the information processing system 1 of a third exemplary embodiment of the present invention. The third exemplary embodiment is different from the first exemplary embodiment in that the controller 20 of the third exemplary embodiment further includes a correcting unit 208 and a display controller 209. Elements identical in configuration and functionality to those of the first exemplary embodiment are not discussed again. The following discussion focuses on a difference between the first exemplary embodiment and the third exemplary embodiment.

The CPU of the controller 20 operates in accordance with the program 210 stored on the memory 21, thereby implementing the functionalities of the correcting unit 208, and the display controller 209 in addition to the functionalities described with reference to the first exemplary embodiment. The correcting unit 208 is an example of a partitioning unit.

Besides performing the functionalities of the first exemplary embodiment, the receiving unit 200 receives an operation signal in response to an operator's operation performed on the operation unit 22. The correcting unit 208 corrects the partitioned state by re-partitioning the partial region in response to the operation signal received by the receiving unit 200. The display controller 209 performs control such that the partial region containing an out-of-range value character or the partial region containing an uncommon character string is displayed to the operator on the display 23.

Figure 9A:
FIG. 9A through FIG. 9C illustrate examples of a re-partitioning process of a partial region.
Figure 9B:
Figure 9C:
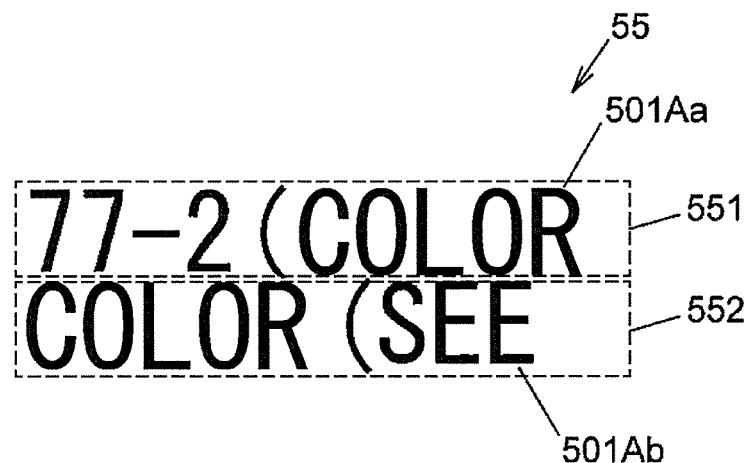

Referring to FIG. 9, the correcting unit 208 and the display controller 209 are described in detail below. FIG. 9A through FIG. 9C illustrate examples of a re-partitioning process of the partial region performed by the correcting unit 208. FIG. 9A illustrates an example in which vertically neighboring character strings are partially in contact with each other. FIG. 9B illustrates an example in which the partial region is re-partitioned using a delineation line. FIG. 9C illustrates a partitioned state subsequent to the re-partitioning.

Referring to FIG. 9A, a character string 501Aa ("77-2(COLOR") at the first row is partially in contact with a character string 501Ab ("COLOR(SEE") at the second row. It is thus difficult to partition the partial region at the contact area, and a partial region 55 containing both character strings 501Aa and 501Ab is thus extracted. In such a case, the partial region 55 is erroneously recognized as one character string.

In such a case, the contact between the character string 501Aa ("77-2(COLOR") at the first row and the character string 501Ab ("COLOR(SEE") at the second row are simply deleted. In response to the operator's operation, the display controller 209 performs control as illustrated in FIG. 9B such that the delineation line 6 is drawn between the character string 501Aa ("77-2(COLOR") at the first row and the character string 501Ab ("COLOR(SEE") at the second row.

The correcting unit 208 partitions the partial region 55 into two regions 551 and 552 by the delineation ling 6 added to the partial region 55 in response to the operator's operation as illustrated in FIG. 9C. If the character recognition unit 202 performs the character recognition process on the two partitioned regions 551 and 552, the two character strings 501Aa and 501Ab are correctly recognized.

The re-partitioning method to re-partition the partial region 55 is not limited to inserting the delineating line 6 along the contact area. Another method may be employed. For example, an area that is to be partitioned may be enclosed by a frame instead of using the delineation line 6. The insertion of the delineation line 6 and the operation of enclosing the area may be performed using a mouse or the like. For convenience of explanation, the two vertically neighboring character strings are in contact with each other. The same is true of two horizontally neighboring character strings that are in contact with each other. In the example described above, the character strings are in contact with each other. The same is true in the case in which a character string is in contact with a line (an underline, a ruled line, or a graphic).

Even if desired recognition results are not obtained in accordance with the first exemplary embodiment or the second exemplary embodiment, the partial region may be re-partitioned in response to the operator's operation, and the character recognition process may be performed.

The exemplary embodiments have been described. The present invention is not limited to the exemplary embodiments described above. Modifications and changes are possible to the exemplary embodiments as long as they fall within the scope of the present invention. The image 5 is not limited to an image input to the information processing apparatus 2 from the outside. For example, an imaging unit (not illustrated) may be arranged in the information processing apparatus 2, and the image 5 may be acquired through the image unit.

Some or all of the elements in the controller 20 may implemented using a hardware circuit, such as a reconfigurable field programmable gate array (FPGA), or an application specific integrated circuit (ASIC).

Some of the elements of the exemplary embodiments may be omitted or modified as long as such a modification does not change the scope of the present invention. A new step may be added, one of the steps may be deleted or modified, and the steps may be interchanged. The program used in the exemplary embodiments may be supplied in a recorded form on a computer readable recording medium, such as a compact disk read only memory (CD-ROM). The program may be stored on an external server, such as a cloud server, and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller configured to:
perform a character recognition process to recognize a character included in an image; and
partition a specific region if a character string recognized through the character recognition process on the specific region included in the image includes a character or a character string, each of which satisfies a predetermined condition, wherein
the specific region is a region corresponding to a partial image contained in the image or a region corresponding to the image as a whole,
the predetermined condition is a condition where a character having a predetermined out-of-range size is included in the character string recognized from the specific region,
the controller is configured to partition the specific region if the predetermined condition is satisfied.

2. The information processing apparatus according to claim 1, wherein the controller is configured to detect, as the character having the predetermined out-of-range size, a character having an out-of-range size identified by a second predetermined index value that is predetermined by a first predetermined index value.

3. The information processing apparatus according to claim 2, wherein the controller is configured to detect the character having the out-of-range size identified by a mean value and a standard deviation, and wherein the first index value is the mean value of sizes of characters included in the image, and wherein the second index value is the standard deviation of the sizes of the characters.

4. The information processing apparatus according to claim 3, wherein the controller is configured to partition the specific region if the predetermined condition that the character string recognized from the specific region includes a character string including a predetermined arrangement is satisfied.

5. The information processing apparatus according to claim 4, wherein the controller is configured to separate a character string included in the character string recognized from the specific region into partial character strings, each partial character string having a predetermined unit,
wherein the controller is configured to partition the specific region if the partial character string includes a character string including the predetermined arrangement.

6. The information processing apparatus according to claim 2, wherein the controller is configured to partition the specific region if the predetermined condition that the character string recognized from the specific region includes a character string including a predetermined arrangement is satisfied.

7. The information processing apparatus according to claim 6, wherein the controller is configured to separate a character string included in the character string recognized from the specific region into partial character strings, each partial character string having a predetermined unit,
wherein the controller is configured to partition the specific region if the partial character string includes a character string including the predetermined arrangement.

8. The information processing apparatus according to claim 1, wherein the controller is configured to partition the specific region if the predetermined condition that the character string recognized from the specific region includes a character string including a predetermined arrangement is satisfied.

9. The information processing apparatus according to claim 8, wherein the controller is configured to separate a character string included in the character string recognized from the specific region into partial character strings, each partial character string having a predetermined unit,
wherein the controller is configured to partition the specific region if the partial character string includes a character string including the predetermined arrangement.

10. The information processing apparatus according to claim 9, wherein the controller is configured to separate, into the partial character strings, a character string included in the character string recognized from the specific region, by performing N-gram or morphological analysis.

11. The information processing apparatus according to claim 8, wherein the controller is configured to convert a first character forming the character string included in the specific region into a second character.

12. The information processing apparatus according to claim 1, wherein if the specific region is partitioned into a plurality of regions, the controller is configured to perform the character recognition process on the partitioned regions.

13. The information processing apparatus according to claim 1, wherein the controller is configured to partition the specific region in response to an operation performed by an operator.

14. The information processing apparatus according to claim 1, wherein the controller is configured to partition the specific region if the predetermined condition that the character having a predetermined out-of-range size is included in the character string recognized from the specific region is satisfied and the predetermined condition that the character string includes a character string including a predetermined arrangement is satisfied.

15. The information processing apparatus according to claim 1, wherein the controller is configured to partition the image into the specific region in advance in accordance with a frequency distribution of pixels of the image.

16. A non-transitory computer readable medium storing a program causing a computer to execute a process for processing information, the process comprising:
performing a character recognition process to recognize a character included in an image; and
partitioning a specific region if a character string recognized through the character recognition process performed on the specific region includes a character or a character string, each of which satisfies a predetermined condition, wherein
the specific region is a region corresponding to a partial image contained in the image or a region corresponding to the image as a whole,
the predetermined condition is a condition where a character having a predetermined out-of-range size is included in the character string recognized from the specific region,
the specific region is partitioned if the predetermined condition is satisfied.

* * * * *